US012437602B2

(12) United States Patent
Shigeta

(10) Patent No.: US 12,437,602 B2
(45) Date of Patent: Oct. 7, 2025

(54) CARD GAME MONITORING SYSTEM

(71) Applicant: ANGEL GROUP CO., LTD., Shiga (JP)

(72) Inventor: Yasushi Shigeta, Shiga (JP)

(73) Assignee: ANGEL GROUP CO., LTD., Shiga (JP)

(*) Notice: Subject to any disclaimer, the term of this patent is extended or adjusted under 35 U.S.C. 154(b) by 0 days.

(21) Appl. No.: 18/102,393

(22) Filed: Jan. 27, 2023

(65) Prior Publication Data

US 2023/0169819 A1 Jun. 1, 2023

Related U.S. Application Data

(63) Continuation of application No. 17/229,976, filed on Apr. 14, 2021, now Pat. No. 11,663,876, which is a (Continued)

(30) Foreign Application Priority Data

Jan. 17, 2014 (AU) ................................ 2014200314

(51) Int. Cl.
*G07F 17/32* (2006.01)

(52) U.S. Cl.
CPC ........ *G07F 17/3206* (2013.01); *G07F 17/322* (2013.01); *G07F 17/3237* (2013.01); (Continued)

(58) Field of Classification Search
CPC ............... G07F 17/3206; G07F 17/322; G07F 17/3237; G07F 17/3241; G07F 17/3248; G07F 17/3276; G07F 17/3293
See application file for complete search history.

(56) References Cited

U.S. PATENT DOCUMENTS 4,531,187 A 7/1985 Uhland
5,781,647 A 7/1998 Fishbine et al.
(Continued)

FOREIGN PATENT DOCUMENTS

AU 2012201094 A1 3/2012
CA 2543251 A1 10/2000
(Continued)

OTHER PUBLICATIONS

International Application No. PCT/JP2015/000171, International Search Report and Written Opinion mailed Mar. 27, 2015.
(Continued)

*Primary Examiner* — David L Lewis
*Assistant Examiner* — Shauna-Kay Hall
(74) *Attorney, Agent, or Firm* — NORTON ROSE FULBRIGHT US LLP

(57) ABSTRACT

The card game monitoring system comprises a game table on which bettors put wagers on betting areas; and a card shooter apparatus has a card reading unit to read and record the number (rank) and suit of the cards; and a control unit to determine a winning hand according to a table game rules based on information of numbers (ranks) and suits of the cards sequentially read by the card reading unit; a monitor video camera system to capture positions of cards and to identify wagers on each betting area at the game table; the control unit has further processing function to check whether wagers with payoff move to a pool of the winner of the bettors determined by the card shooter apparatus at the end of each game.

20 Claims, 2 Drawing Sheets

Related U.S. Application Data continuation of application No. 15/112,038, filed as application No. PCT/JP2015/000171 on Jan. 16, 2015, now Pat. No. 11,145,158.

(52) U.S. Cl.
CPC ...... *G07F 17/3241* (2013.01); *G07F 17/3248* (2013.01); *G07F 17/3276* (2013.01); *G07F 17/3293* (2013.01)

(56) References Cited

U.S. PATENT DOCUMENTS

| | | | |
|---|---|---|---|
| 5,831,527 | A | 11/1998 | Jones, II |
| 6,093,103 | A | 7/2000 | McCrea |
| 6,117,012 | A | 9/2000 | McCrea |
| 6,460,848 | B1 | 10/2002 | Soltys et al. |
| 6,514,140 | B1 | 2/2003 | Storch |
| 6,582,301 | B2 | 6/2003 | Hill |
| 6,848,994 | B1 | 2/2005 | Knust et al. |
| 6,908,385 | B2 | 6/2005 | Green |
| 7,213,812 | B2 | 5/2007 | Schubert et al. |
| 7,661,676 | B2 | 2/2010 | Smith et al. |
| 8,337,296 | B2 | 12/2012 | Grauzer et al. |
| 8,490,973 | B2 | 7/2013 | Yoseloff et al. |
| 9,189,918 | B1 | 11/2015 | Gronkowski et al. |
| 11,580,746 | B2 | 2/2023 | Vo et al. |
| 2002/0042298 | A1 | 4/2002 | Soltys et al. |
| 2002/0045476 | A1 | 4/2002 | Poole et al. |
| 2002/0045479 | A1 | 4/2002 | Soltys et al. |
| 2002/0089120 | A1 | 7/2002 | Miller |
| 2002/0123376 | A1 | 9/2002 | Walker et al. |
| 2002/0155869 | A1 | 10/2002 | Soltys et al. |
| 2003/0064798 | A1 | 4/2003 | Grauzer et al. |
| 2003/0069071 | A1* | 4/2003 | Britt .................... G07F 17/3239 463/42 |
| 2003/0087696 | A1 | 5/2003 | Soltys et al. |
| 2003/0195025 | A1 | 10/2003 | Hill |
| 2003/0232651 | A1 | 12/2003 | Huard et al. |
| 2005/0012270 | A1 | 1/2005 | Schubert |
| 2005/0026680 | A1* | 2/2005 | Gururajan ............... G07F 17/32 463/25 |
| 2005/0051965 | A1 | 3/2005 | Gururajan |
| 2005/0062226 | A1 | 3/2005 | Schbert et al. |
| 2005/0137005 | A1 | 6/2005 | Soltys et al. |
| 2005/0148391 | A1 | 7/2005 | Tain |
| 2005/0258597 | A1 | 11/2005 | Soltys |
| 2005/0272501 | A1 | 12/2005 | Tran et al. |
| 2005/0288086 | A1 | 12/2005 | Schubert et al. |
| 2006/0027970 | A1 | 2/2006 | Kyrychenko |
| 2006/0063577 | A1 | 3/2006 | Downs, III |
| 2006/0160608 | A1 | 7/2006 | Hill et al. |
| 2006/0177109 | A1 | 8/2006 | Storch |
| 2006/0183540 | A1 | 8/2006 | Grauzer et al. |
| 2006/0199649 | A1 | 9/2006 | Soltys et al. |
| 2006/0202422 | A1 | 9/2006 | Bahar |
| 2006/0217199 | A1 | 9/2006 | Adcox et al. |
| 2006/0252521 | A1 | 11/2006 | Gururajan et al. |
| 2007/0015583 | A1 | 1/2007 | Tran |
| 2007/0049369 | A1 | 3/2007 | Kuhn et al. |
| 2007/0077987 | A1* | 4/2007 | Gururajan ............. G07F 17/322 463/22 |
| 2007/0111773 | A1 | 5/2007 | Gururajan et al. |
| 2007/0117604 | A1 | 5/2007 | Hill |
| 2007/0178955 | A1 | 8/2007 | Mills |
| 2008/0113783 | A1 | 5/2008 | Czyzewski et al. |
| 2008/0143048 | A1 | 6/2008 | Shigeta |
| 2008/0180250 | A1 | 7/2008 | Steil |
| 2008/0303210 | A1 | 12/2008 | Grauzer et al. |
| 2009/0075725 | A1 | 3/2009 | Koyama |
| 2009/0104961 | A1 | 4/2009 | Hamada et al. |
| 2009/0121434 | A1 | 5/2009 | Baerlocher et al. |
| 2009/0131151 | A1 | 5/2009 | Harris et al. |
| 2009/0140492 | A1 | 6/2009 | Yoseloff et al. |
| 2009/0143141 | A1 | 6/2009 | Wells et al. |
| 2009/0176546 | A1 | 7/2009 | Kyrychenko |
| 2009/0191933 | A1 | 7/2009 | French |
| 2009/0233699 | A1 | 9/2009 | Koyama |
| 2009/0273141 | A1 | 11/2009 | Bahar |
| 2010/0016050 | A1 | 1/2010 | Snow et al. |
| 2010/0109244 | A1 | 5/2010 | Low |
| 2010/0207324 | A1 | 8/2010 | Soltys et al. |
| 2010/0244382 | A1 | 9/2010 | Snow |
| 2011/0052049 | A1 | 3/2011 | Rajaraman et al. |
| 2011/0079959 | A1 | 4/2011 | Hartley |
| 2011/0127722 | A1 | 6/2011 | Emori et al. |
| 2011/0130184 | A1 | 6/2011 | Mills |
| 2011/0227703 | A1 | 9/2011 | Kotab |
| 2012/0080845 | A1 | 4/2012 | Emori et al. |
| 2012/0231866 | A1 | 9/2012 | Witty et al. |
| 2012/0252564 | A1 | 10/2012 | Moore et al. |
| 2013/0109455 | A1 | 5/2013 | Grauzer et al. |
| 2013/0307215 | A1 | 11/2013 | Shigeta |
| 2014/0094239 | A1 | 4/2014 | Grauzer et al. |
| 2014/0274252 | A1 | 9/2014 | Chun |
| 2015/0087417 | A1* | 3/2015 | George ............... G07F 17/3237 463/31 |
| 2015/0375096 | A1 | 12/2015 | Jackson et al. |
| 2018/0247134 | A1 | 8/2018 | Bulzacki et al. |
| 2020/0034629 | A1 | 1/2020 | Vo et al. |
| 2020/0302168 | A1 | 9/2020 | Vo et al. |
| 2021/0232828 | A1 | 7/2021 | Vo et al. |
| 2023/0154279 | A1 | 5/2023 | Shigeta |

FOREIGN PATENT DOCUMENTS

| | | | |
|---|---|---|---|
| CN | 101687112 | A | 3/2010 |
| CN | 102125756 | A1 | 7/2011 |
| CN | 102892472 | A | 1/2013 |
| CN | 103418128 | A | 12/2013 |
| EP | 2545967 | A2 | 1/2013 |
| EP | 2613298 | A1 | 7/2013 |
| JP | 2012075781 | A | 4/2012 |
| MO | 1001207 | A | 11/2013 |
| TW | 201200214 | A | 1/2012 |
| WO | 98/33566 | A1 | 8/1998 |
| WO | 01/91866 | A1 | 12/2001 |
| WO | 2005/025701 | A2 | 3/2005 |

OTHER PUBLICATIONS

Written Opinion of the Intellectual Property Office of Singapore dated Jul. 10, 2017 issued in Singapore Application No. 11201605347T.
Search Report of the Intellectual Property Office of Singapore dated Jul. 7, 2017 completed in Singapore Application No. 11201605347T.
Office Action dated Dec. 1, 2017 for EP Application 15701853.2 .
Office Action dated Jun. 29, 2017 for New Zealand Application 721845.
Office Action dated Sep. 8, 2017 for U.S. Appl. No. 15/112,038.
Office Action dated Jul. 13, 2018 for parent U.S. Appl. No. 15/112,038.
Office Action dated Jul. 26, 2018 for U.S. Appl. No. 15/894,090.
European Search report dated Sep. 25, 2018 for EP Application 18187764.8.
U.S. Office Action dated Nov. 20, 2018 for U.S. Appl. No. 15/998,000.
U.S. Office Action dated Jan. 10, 2019 for U.S. Appl. No. 15/894,090.
Singaporean Office Action dated May 13, 2019 for SG Application No. 10201801579R.
Examination Report for AU Application No. 2018203865 dated Aug. 14, 2019.
Final Action for U.S. Appl. No. 16/000,056 dated Aug. 20, 2019.
Search Report & Written Opinion for SG Application No. 10201804982S dated Aug. 21, 2019.
Final Action for U.S. Appl. No. 15/998,000 dated Sep. 9, 2019.
Chinese Office Action dated Jan. 3, 2020 issued in CN Application No. 201810096721.5.
US Office Action dated Apr. 17, 2020 issued in U.S. Appl. No. 15/998,000.
US Office Action dated Jun. 26, 2020 issued in U.S. Appl. No. 15/894,090.

(56) References Cited

OTHER PUBLICATIONS

US Final Office Action dated Nov. 10, 2020 issued in U.S. Appl. No. 16/150,378.
US Notice of Allowance dated Jan. 13, 2021 issued in U.S. Appl. No. 16/000,056.
US Office Action dated Mar. 14, 2023 issued in U.S. Appl. No. 17/521,078.
US Office Action dated Oct. 4, 2023 issued in U.S. Appl. No. 18/102,357.
US Office Action dated Jun. 10, 2021 issued in U.S. Appl. No. 15/998,000.
Chinese Office Action dated Jun. 9, 2021 issued in CN Application No. 202010076775.2.
Chinese Office Action dated Jun. 9, 2021 issued in CN Application No. 202010076776.2.
Chinese Office Action dated Jun. 23, 2021 issued in CN Application No. 202010076770.X.
JP Decision of Dismissal of Amendment dated Apr. 12, 2022 issued in JP Application No. 2020-178113.
US Notice of Allowance dated Mar. 22, 2022 issued in U.S. Appl. No. 15/998,000.
Chinese Office Action dated Mar. 21, 2022 issued in CN Application No. 201810096721.5.
Filipino Office Action dated Jul. 4, 2022 issued in PH Application No. 1-2021-553100.

* cited by examiner

CARD GAME MONITORING SYSTEM

CROSS-REFERENCE TO RELATED APPLICATIONS

The present application is a continuation of U.S. patent application Ser. No. 17/229,976 filed Apr. 14, 2021, which is a continuation of U.S. patent application Ser. No. 15/112,038 filed Jul. 15, 2016 (now U.S. Pat. No. 11,145,158), which is a 35 U.S.C. § 371 national phase application of International Application No. PCT/JP2015/000171 filed Jan. 16, 2015, which claims priority to AU Application No. 2014200314 filed Jan. 17, 2014, each of which is hereby incorporated by reference in its entirety.

TECHNICAL FIELD

The present invention relates to a table game monitoring system for a table game using playing cards from a shoe having multiple decks that have been shuffled together prior to the beginning of play in which bettors make wagers on betting areas of a game table in front of the bettors. This table game monitoring system monitors whether or not wagers of winning bettor(s) move to appropriate area of the winner(s).

BACKGROUND ART

Baccarat and Black Jack are of the many live table games played in casinos or gaming establishments. These games use a standard deck of 52 playing cards and are usually dealt from a shoe having multiple decks (6 to 9 or 10 decks) that have been shuffled together prior to the beginning of play. When operating people (hereinafter "the dealer") in casinos deliver playing cards to a game table for plays in such games, any loss of cards or exchange of cards between bettors, etc. should not occur, and also wagers with payoffs must correctly go to the winners of the bettors after each game has ended.

To assure fair games by preventing such loss or exchanges during games, the game tables in casinos should be administrated so that games at tables are played properly (i.e. there is no exchange of cards or any other accidental or fraudulent acts etc.) and wagers are correctly paid off to the winners. A system to monitor the game tables by camera is known and is disclosed in U.S. Pat. No. 6,582,301. This known system only monitors the table game and records whole games for later analysis if it is believed that some inappropriate act has occurred.

SUMMARY OF INVENTION

The present invention provides a real-time monitoring of the table game and enables the casino to stop an ongoing game immediately when something unexpected happens by administrating the whole game from the start to the end of the game.

The present invention has been made in view of the above problem, and aims to provide a table game monitoring system with which it is possible to allow a casino to stop an ongoing game immediately when something unexpected happens by administrating the whole game from the start to the end of the game and during payoffs.

To solve the above conventional problems, the present invention provides the card game monitoring system having: a game table on which bettors make wagers on betting areas, a card shooter apparatus that is put on the game table and has a card reading unit that reads the number (rank) of the card and having a control unit to determine a winning hand according to a table game rules based on information of numbers of the cards sequentially read by the card reading unit and a monitor video camera system to capture positions of the card delivered from the card shooter apparatus to bettors and identify wagers on each betting area at the game table, the control unit has a processing function using the information of the monitor video camera system to determine: 1) head-count of the bettors playing each game by identifying the wagers on each betting area or cards delivered to bettors, 2) whether or not each bettor gets more than two cards from the card shooter apparatus, 3) each hand of the bettors and the dealer according to the information read by the card shooter apparatus using the information of head-count of the bettors according to the game rule, and 4) the winner(s) having the winning hand(s) in the game according to the game rule based on the information of the each hand of the bettors and the dealer, wherein the monitor video camera system further reads movements of wagers on the game table, and the control unit having further processing function to check whether wagers with payoffs move to the winner of the bettor determined by the card shooter apparatus at the end of each game.

In the card game monitoring system, the control unit has further processing function to identify ranks of playing cards on the game table delivered by a dealer and to check and report whether ranks of cards are the same as the ones determined by the card shooter apparatus.

DESCRIPTION OF EMBODIMENTS

Figure 1:
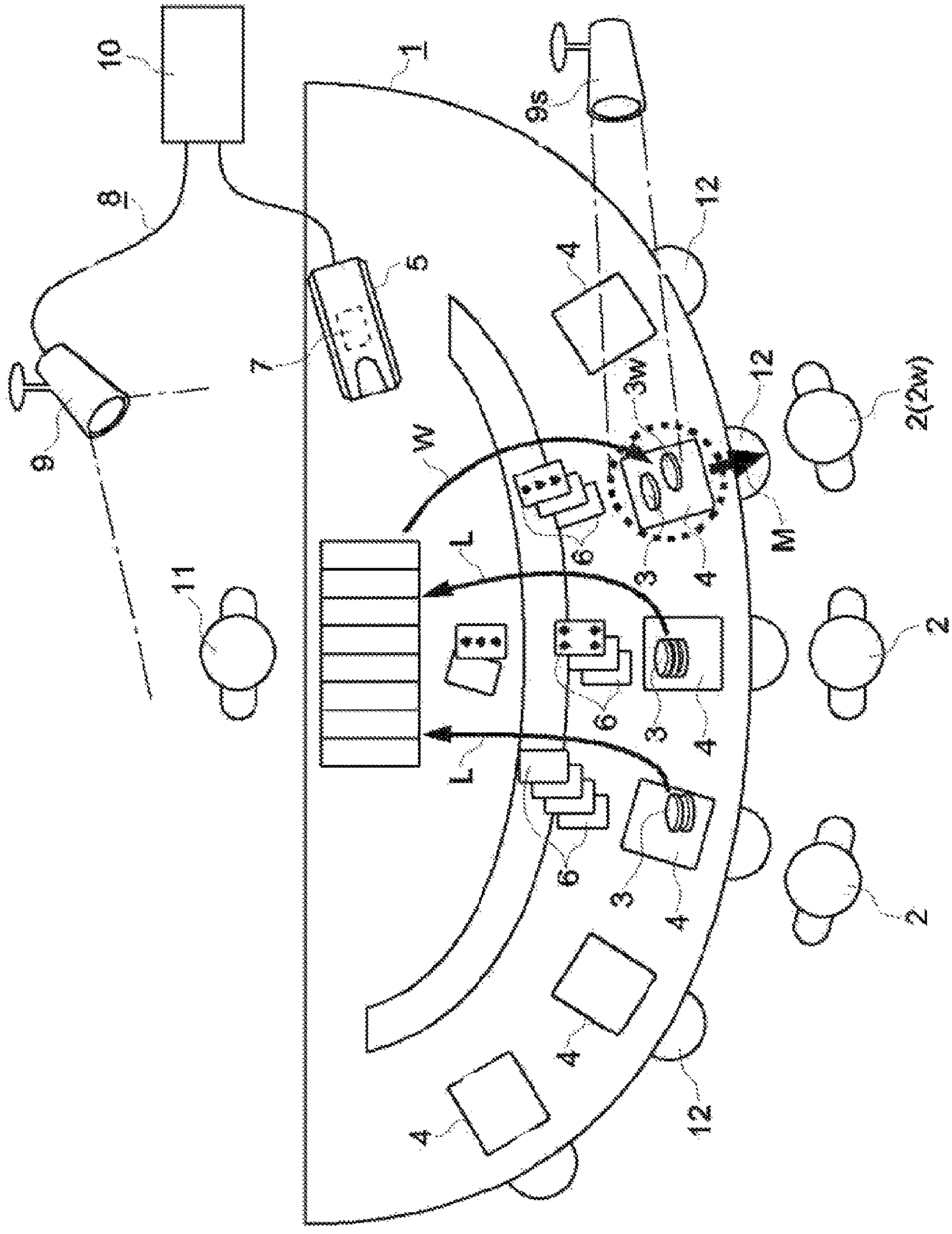
FIG. 1 is a diagram schematically showing the entirety of a table game system according to an embodiment 1 of the present invention.

Embodiment 1 of the present invention will be described with reference to the attached drawings. Embodiment 1 of the present invention provides a card game monitoring system for playing Black Jack. In FIG. 1, the card game monitoring system has: a game table 1 on which bettors 2 make wagers by putting wagers 3 on betting areas 4; a card shooter apparatus that is put on the game table 1 and has a card reading unit that reads the number (rank) and suit of the cards 6 and having a control unit 7 to determine a winning hand according to a table game rule based on information of numbers (ranks) of the cards sequentially read by the card reading unit 5.

A monitor video camera system 8 which has several cameras 9 is set above each game table 1 to capture the positions of cards 6 delivered from the card shooter apparatus 5 to bettors 2. The monitor video camera system 8 identifies wagers 3 on each betting area 4 at the game table 1, the control unit 10 has a processing function using the information of the monitor video cameras 9 to determine the following: 1) head-count of the bettors playing on each game by identifying the positions of wagers on each betting area or cards delivered to each bettor 2 (three persons (heads) shown in FIG. 1), 2) number of cards delivered for each bettor 2 by dealer 11 from the card shooter apparatus 5 (whether or not each bettor 2 gets more than two cards).

The control unit 10 has further processing function using information from the monitor video cameras 9 to determine each hand of the bettors 2 and the dealer 11 according to the information read by the card shooter apparatus 5 using the information of the results of head-counting of the bettors 2 and according to the game rules installed in the control unit 7 of the card shooter apparatus 5. Then the control unit 7 will determine the winner W having the winning hand on the game based on the information of the hands of the bettors 2 and the dealer 11.

Wherein the card shooter apparatus 5 knows directions of each card (who gets each card read by the card shooter apparatus 5 through the monitor video camera system 8) and then the card shooter apparatus 5 (the control unit 7) will figure out by its programs the hands held by the bettors 2 and the dealer 11. The control unit 10 has further a processing function to check whether wagers 3 with payoffs 3W move to a pool 12 of the winner 2W of the bettors 2 determined by the card shooter apparatus 5 at the end of each game (the movement M for the winners and L for loser in FIG. 1).

The monitor video camera system 8 (with the control unit 10) has further processing function that identify ranks of playing cards 6 by analyzing pictures from the monitor video cameras 9 to determine each hand (number) of the bettors 2 on the game table delivered by a dealer 11 and checks whether suits and ranks of cards 6 are the same as the ones read and determined by the card shooter apparatus 5.

The monitor video camera system 8 (the control unit 10) has further processing function that identifies total amounts of wagers 3 by counting chips on each betting area 4 of the bettors 2. Each total amount of wagers 3 are calculated by analyzing pictures from the monitor video cameras 9 of its colors and its height of chips on each betting areas 4. Special video cameras 9*s* for this purpose may be put around the game table 1 to take side views of the chips of wagers 3.

Figure 2:
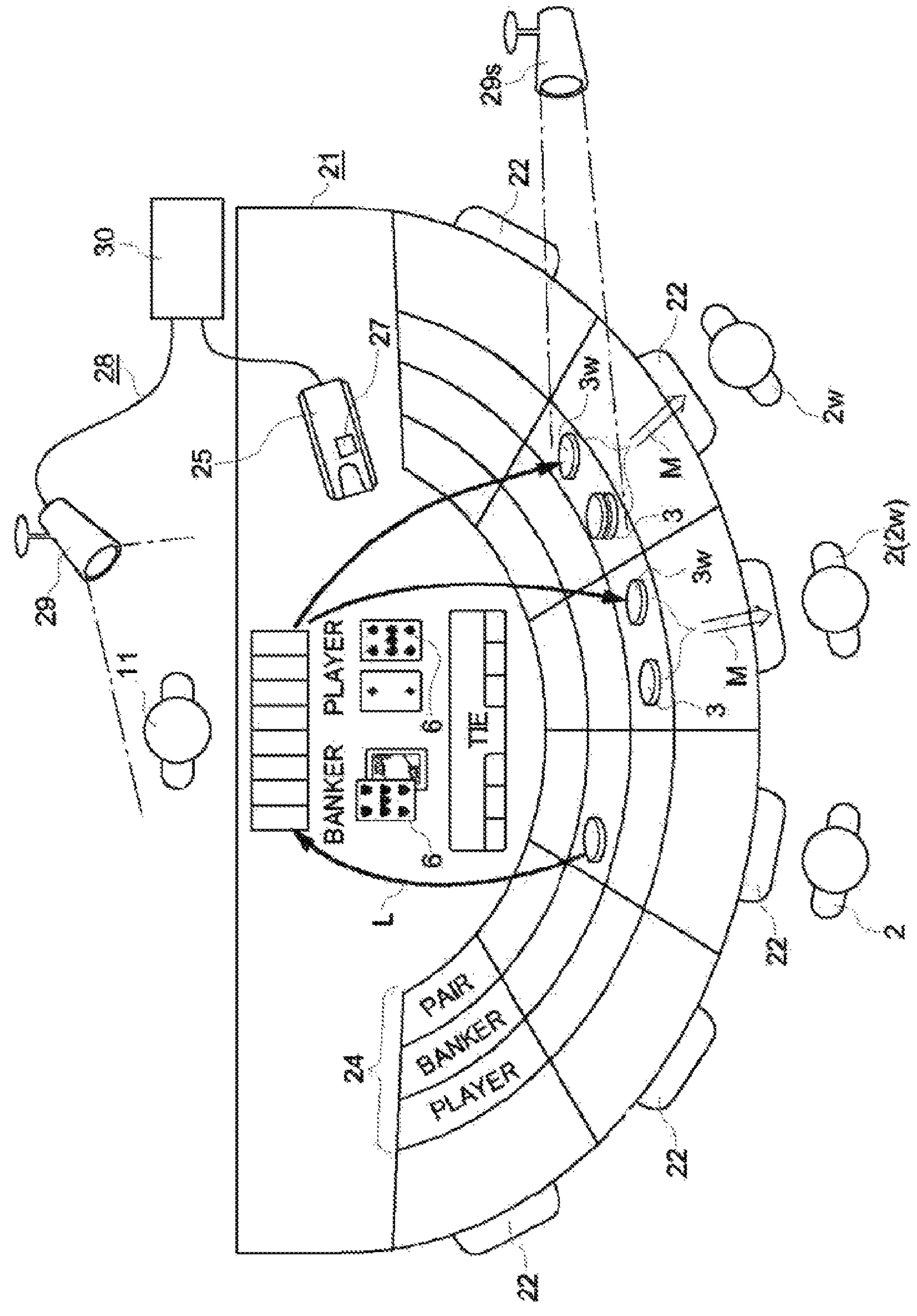
FIG. 2 is a diagram schematically showing the entirety of a table game system according to an embodiment 2 of the present invention.

FIG. 2 shows an example of Embodiment 2 of the present invention. Embodiment 2 of the present invention provides a card game monitoring system for playing game (Baccarat). In FIG. 2, the card game monitoring system has: a game table 21 on which bettors 2 make wagers by putting wagers 3 on betting areas 24; a card shooter apparatus 25 that is put on the game table 21 and has a card reading unit that reads the number (rank) and suit of the cards 6 and having a control unit 27 to determine a winning hand according to a table game rule based on information of numbers (ranks) of the cards 6 sequentially read by the card shooter apparatus 25.

A monitor video camera system 28 reads cards and movements of the wagers 3 on the game table. The control unit 27 of the card shooter apparatus 25 has processing functions to determine whether the winning hand is the Banker or the Player based on information of numbers (ranks) of the cards read by the a card shooter apparatus 25 and Baccarat game rule in the control unit 27. A control unit 30 of the card game monitoring system having processing function to check whether wagers 3 with payoffs 3W move to a pool 22 of the winners 2W of the bettors 2 after each game has ended.

Wherein the card shooter apparatus 25 knows that place (Banker or Player) to which each card is delivered according to the game rule of Baccarat and then the card shooter apparatus 25 (with the control unit 27) will calculate each hand of Banker and Player. In this way the card shooter apparatus 25 determines whether a winning hand is the Banker or the Player. The control unit 30 has a further processing function to check whether wagers 3 with payoffs 3W move to a pool 22 of the winner 2W of the bettors 2 determined by the card shooter apparatus 25 at the end of each game (the movement M for the winners and L for loser movement M in FIG. 2).

The monitor video camera system 28 (with the control unit 30) has further processing function that identify ranks of playing cards 6 on the game table 21 delivered by a dealer 11 by analyzing pictures obtained from the monitor video cameras 29. This card game monitoring system checks whether suits and ranks of cards 6 are the same as the ones read and determined by the card shooter apparatus 25 and reports to an administration section of the casino the results of whether the suits and ranks of cards 6 are the same as those delivered and read by the card shooter apparatus 25.

The monitor video camera system 28 (the control unit 30) has further processing function that identify total amounts of wagers 3 by counting chips on each betting area 24 of the bettors 2. Each total amount of wagers 3 is calculated by analyzing pictures from the monitor video cameras 29 of its colors and its height of chips on each betting areas 24. Special video cameras 29*s* for this purpose may be put around the game table 21 to take side views of the chips of wagers 3.

In both examples of Embodiment 1 and 2 the monitor video camera system 8 and 28 can identify positions of wagers 3, the total amount of wagers 3 of its colors and its height of chips on each betting areas 4 and 24 by analyzing pictures taken by the video cameras 9, 9*s*, 29 and 29*s* using CCD and through known technology of vision analysis. The monitor video camera system 8 and 28 can also identify positions of cards 3 and analyze the faces of cards showing in betting.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

Annex 1: The card game monitoring system mentioned above, the card shooter apparatus has further determination function of the card games when each game starts and ends according to the rules of Baccarat or Black Jack with monitoring video camera system.

Annex 2: The card game monitoring system mentioned above, the control unit has further processing function to check whether wagers do not move from the original betting position to the other area during the each game starts and ends (during each game).

Annex 3: The card game monitoring system mentioned above, the control unit has a determination function to determine when the betting starts before the start of each game (the betting start indicates the time the first bet is put on the betting area).

Annex 4: The card game monitoring system mentioned above, the control unit has a determination function to determine when the betting ends before the start of each game (the betting end indicates the time the first card is delivered from the card shooter apparatus). Also the control unit has a processing function using the information from the monitor video camera system to determine the movement of the dealer's hand representing the end of betting called "No more bet."

Annex 5: The card game monitoring system mentioned above, the control unit has a determination function to determine when the payoff has completed after the end of each game.

Annex 6: The card game monitoring system mentioned above, the control unit has a transmitting function to transmit the information of the monitor video camera to a backyard in casino.

Annex 7: The card game monitoring system mentioned above, the control unit has a determination function to determine an error, and the card game monitoring system further has an output means to output an error signal by displaying and/or alarming in the card shooter apparatus and/or the related system components incorporated in the card game monitoring system as a result of the determination of the error. The error mentioned above includes at least one of the following items: 1) The ranks of playing cards identified by the card game monitoring system on the game table delivered by the dealer are not same as the ones determined by the card shooter apparatus; 2) Wagers have moved from the original betting position to other areas during each game; and 3) Wagers with payoffs have not moved to the winners of the bettors at the end of each game.

Annex 8: The card game monitoring system mentioned above, the control unit has a determination function to identify a cut card delivered from the card shooter apparatus.

The invention claimed is:

1. A system comprising:

at least one camera configured to capture one or more images of a gaming table; and a computing device coupled to the at least one camera, wherein the computing device is configured to:

receive the one or more images captured by the at least one camera;

analyze at least one image of the one or more images to identify a presence of a feature of the at least one image associated with the gaming table;

based on identification of the presence of the feature, determine whether the feature corresponds to a game event; and in response to a determination that the feature corresponds to the game event, determine a time associated with the game event;

wherein the computing device is further configured to:

compare at least a portion of the feature with stored configuration data relating to a prescribed game start trigger to determine whether the feature is a game start trigger.

2. The system of claim 1, wherein the one or more images include an image of a table surface of the gaming table.

3. The system of claim 1, wherein the system is configured to monitor game play on a table surface of the gaming table.

4. The system of claim 1, wherein the computing device is communicatively coupled to the at least one camera.

5. The system of claim 1, wherein the computing device is configured to receive the one or more images in real time.

6. The system of claim 1, wherein the computing device is configured to analyze the at least one image in real time.

7. The system of claim 1, wherein the computing device is further configured to identify the presence of the feature on the gaming table.

8. The system of claim 1, wherein the feature includes a game object or a game instance.

9. The system of claim 1, wherein the computing device is further configured to transmit data to a server.

10. The system of claim 9, wherein the data includes a first indicator that indicates a game start event, a second indicator that indicates the time, or a combination thereof.

11. The system of claim 1, wherein the game event is a game start event.

12. The system of claim 1, wherein the computing device is further configured to, in response to the determination that the feature corresponds to the game event, determine that the game event has occurred.

13. The system of claim 1, wherein the game event is an end of betting.

14. The system of claim 1, wherein the game event is a start of a game.

15. The system of claim 1, wherein the game event is a betting start.

16. The system of claim 1, wherein the feature includes a hand movement of a dealer.

17. The system of claim 16, wherein the hand movement indicates no more betting.

18. The system of claim 1, wherein the feature includes a first bet placed on a betting area of the gaming table.

19. The system of claim 1, wherein the feature includes a first card delivered to the gaming table.

20. The system of claim 1, wherein the computing device further configured to:

analyze the at least one image to identify a presence of a gaming chip on the game table;

based on identification of the presence of the gaming chip, determine whether the gaming chip is a first bet gaming chip; and in response to a determination that the gaming chip is the first bet gaming chip, determine that a betting has started and a time when the betting has started.

* * * * *